US008852376B2

(12) United States Patent
Qian et al.

(10) Patent No.: US 8,852,376 B2
(45) Date of Patent: Oct. 7, 2014

(54) METHOD FOR MAKING HEATERS

(75) Inventors: Li Qian, Beijing (CN); Yu-Quan Wang, Beijing (CN); Chen Feng, Beijing (CN); Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 50 days.

(21) Appl. No.: 13/464,342

(22) Filed: May 4, 2012

(65) Prior Publication Data

US 2013/0146214 A1 Jun. 13, 2013

(30) Foreign Application Priority Data

Dec. 9, 2011 (CN) .......................... 2011 1 0408579

(51) Int. Cl.

| | |
|---|---|
| ***H05B 3/34*** | (2006.01) |
| ***B32B 37/02*** | (2006.01) |
| ***B32B 38/04*** | (2006.01) |
| ***B82Y 40/00*** | (2011.01) |

(52) U.S. Cl.

USPC ........ 156/256; 156/192; 156/193; 156/272.8; 156/263

(58) Field of Classification Search

CPC .... H05B 3/34; H05B 2203/017; B32B 37/02; B32B 38/0004; B32B 38/04; B32B 2307/202; B82Y 40/00

USPC .............. 156/192, 193, 272.8, 256, 259, 263; 977/842, 949; 29/826

See application file for complete search history.

(56) References Cited

U.S. PATENT DOCUMENTS

| | | | | |
|---|---|---|---|---|
| 8,048,256 | B2 | 11/2011 | Feng et al. | |
| 8,431,053 | B2 * | 4/2013 | Liu et al. | 264/81 |
| 2009/0096348 | A1 | 4/2009 | Liu et al. | |
| 2009/0321421 | A1 | 12/2009 | Feng et al. | |
| 2010/0308489 | A1 | 12/2010 | Feng et al. | |
| 2011/0052478 | A1 | 3/2011 | Feng et al. | |
| 2011/0155295 | A1 | 6/2011 | Fan et al. | |
| 2011/0155312 | A1 | 6/2011 | Feng et al. | |

FOREIGN PATENT DOCUMENTS

| | | |
|---|---|---|
| CN | 101616515 | 12/2009 |
| TW | 200920168 | 5/2009 |
| TW | 201043569 | 12/2010 |
| TW | 201109275 | 3/2011 |
| TW | 201127749 | 8/2011 |
| TW | 201134752 | 10/2011 |

* cited by examiner

*Primary Examiner* — Linda L Gray

(74) *Attorney, Agent, or Firm* — Novak Druce Connolly Bove + Quigg LLP

(57) ABSTRACT

A method for making a heater is related. A rotator having an axis and a flexible substrate with a plurality of electrodes located on a surface of the flexible substrate are provided. The flexible substrate is fixed on a surface of the rotator and a carbon nanotube film drawn from a carbon nanotube array is adhered on the surface of the flexible substrate. The rotator is rotated about the axis to wrap the carbon nanotube film on the surface of the flexible substrate to form a carbon nanotube layer. The flexible substrate and the carbon nanotube layer are cut along a direction to form the heater.

10 Claims, 4 Drawing Sheets

METHOD FOR MAKING HEATERS

RELATED APPLICATIONS

This application claims all benefits accruing under 35 U.S.C. §119 from China Patent Application No. 201110408579.1, filed on Dec. 9, 2011 in the China Intellectual Property Office, the disclosure of which is incorporated herein by reference. This application is related to applications entitled, "METHOD FOR MAKING CARBON NANOTUBE FILM STRUCTURES", Ser. No. 13/464,349, filed on May 4, 2012.

BACKGROUND

1. Technical Field

The present disclosure relates to a method for making heaters.

2. Discussion of Related Art

Carbon nanotubes composed of a plurality of coaxial cylinders of graphite sheets have received a great deal of interest since the early 1990s. Carbon nanotubes have interesting and potentially useful electrical and mechanical properties. Due to these and other properties, carbon nanotubes have become a significant focus of research and development for use in electron emitting devices, sensors, transistors, and other devices.

Generally, carbon nanotubes can be used in the electric heater field because of their conductivity. A typical carbon nanotube heater includes a carbon nanotube structure and at least two electrodes. The carbon nanotube structure is located between the two electrodes. The carbon nanotube structure generates heat when a voltage is applied to it. The carbon nanotube structure can be formed by stacking a plurality of carbon nanotube films together. However, the time that is needed for making the carbon nanotube structure and the carbon nanotube heater is very long, and the process is complex, which limits applications of such heater.

Therefore, a method for making a heater is needed, to overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
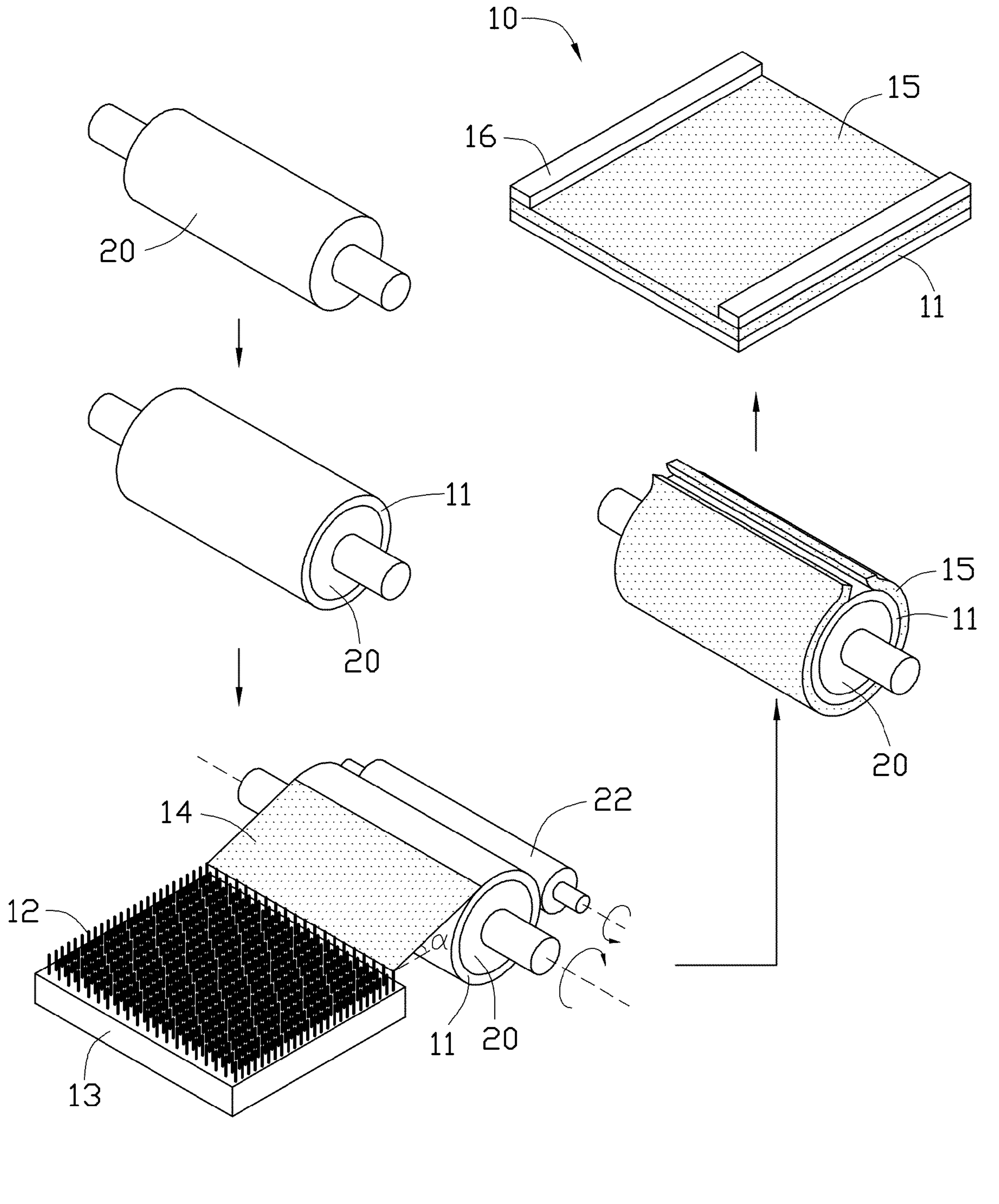
FIG. 1 shows a flow chart of one embodiment of a method to form a heater.

Referring to FIG. 1, a method for making a heater 10 of one embodiment can include the following steps:

(S10) providing a rotator 20 having an axis, the rotator 20 can rotate about the axis;

(S11) providing a flexible substrate 11 and fixing the flexible substrate 11 on a surface of the rotator 20;

(S12) drawing a carbon nanotube film 14 from a carbon nanotube array 12 and adhering the carbon nanotube film 14 on a surface of the flexible substrate 11;

(S13) rotating the rotator 20 about the axis and wrapping the carbon nanotube film 14 on the surface of the flexible substrate 11 to form a carbon nanotube layer 15;

(S14) cutting the flexible substrate 11 and the carbon nanotube layer 15 along a first direction; and (S15) forming a plurality of electrodes 16 to electrically connect with the carbon nanotube layer 15.

In step (S10), the rotator 20 can be a cylinder, triangular column and multi-angular column. In one embodiment, the rotator 20 is a cylinder. The rotator 20 can be fixed to an electrical motor (not shown) and can be rotated by the electrical motor about its axis under a certain rotating speed.

In step (S11), a shape and a size of the flexible substrate 11 can be selected according to the rotator 20. The flexible substrate 11 can be a hollow tub structure, a planar structure, or other regular/irregular structures. In one embodiment, the flexible substrate 11 is a planar structure. The planar structure can be curled to form a hollow tub structure by attaching a first end of the planar structure to a second end of the planar structure. An interior diameter of the hollow tub structure is equal to an external diameter of the cylinder, so that the hollow tub structure can cover on an outer surface of the cylinder.

A material of the flexible substrate 11 can comprise of insulation materials or fireproof materials having certain toughness and strength. The material of the flexible substrate 11 can be silicone rubber, PVC, PTFE, or non-woven cloth. In one embodiment, the flexible substrate 11 is a rectangular non-woven cloth.

After the flexible substrate 11 is fixed on the surface of the rotator 20, the flexible substrate 11 can also be rotated with the rotator 20 about the axis of rotator 20 under a certain rotating speed.

In step (S12), a method for drawing the carbon nanotube film 14 from the carbon nanotube array 12 includes: (S121) providing a carbon nanotube array 12 capable of having a film drawn therefrom; and (S122) pulling/drawing out a carbon nanotube film 14 from the carbon nanotube array 12. The pulling/drawing can be done by using a tool (e.g., adhesive tape, pliers, tweezers, or another tool allowing multiple carbon nanotubes to be gripped and pulled simultaneously).

In step (S121), the carbon nanotube array 12 can be formed by a chemical vapor deposition (CVD) method. The carbon nanotube array 12 includes a plurality of carbon nanotubes parallel to each other and approximately perpendicular to the substrate 13. The carbon nanotubes in the carbon nanotube array 12 are closely packed together by van der Waals force. The carbon nanotubes in the carbon nanotube array 12 can be single-walled carbon nanotubes, double-walled carbon nanotubes, multi-walled carbon nanotubes, or any combination thereof. The diameter of the carbon nanotubes can be in the range from about 0.5 nanometers to about 50 nanometers. The height of the carbon nanotubes can be in the range from about 50 nanometers to about 5 millimeters. In one embodiment, the height of the carbon nanotubes can be in a range from about 100 microns to about 900 microns.

In step (S122), the carbon nanotube film 14 includes a plurality of carbon nanotubes, and there are interspaces between adjacent two carbon nanotubes. Carbon nanotubes in the carbon nanotube film 14 can be substantially parallel to a surface of the carbon nanotube film 14. A distance between adjacent two carbon nanotubes can be larger than a diameter of the carbon nanotubes. The carbon nanotube film 14 can be pulled/drawn by the following sub-steps: (S1221) selecting a carbon nanotube segment having a predetermined width from the carbon nanotube array 12; and (S1222) pulling the carbon nanotube segment at an even/uniform speed to achieve a uniform drawn carbon nanotube film 14.

In step (S1221), the carbon nanotube segment having a predetermined width can be selected by using an adhesive tape such as the tool to contact the carbon nanotube array 12. The carbon nanotube segment includes a plurality of carbon nanotubes parallel to each other. In step (S1222), the pulling direction is substantially perpendicular to a growing direction of the carbon nanotube array 12.

Figure 2:
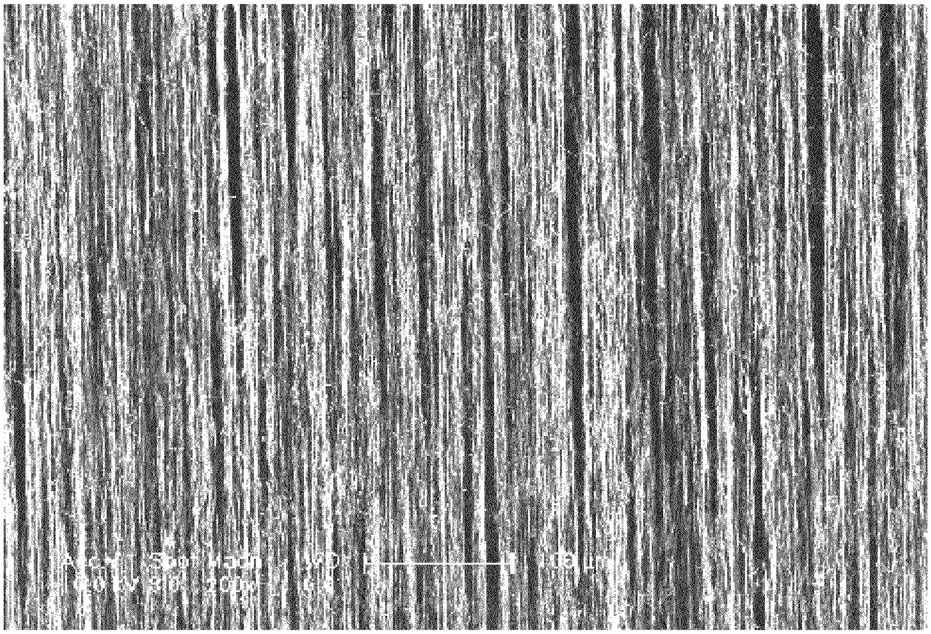
FIG. 2 shows a scanning electron microscope (SEM) image of one embodiment of a carbon nanotube film.

More specifically, during the pulling process, as the initial carbon nanotube segment is drawn out, other carbon nanotube segments are also drawn out end-to-end due to the van der Waals force between the ends of the adjacent segments. This process of drawing ensures that a continuous, uniform drawn carbon nanotube film 14 having a predetermined width can be formed. Referring to FIG. 2, the carbon nanotube film 14 includes a plurality of carbon nanotubes joined end-to-end. The carbon nanotubes in the carbon nanotube film 14 are parallel to the pulling/drawing direction of the drawn carbon nanotube film 14. A large number of the carbon nanotubes in the carbon nanotube film 14 can be oriented along a preferred orientation, meaning that a large number of the carbon nanotubes in the carbon nanotube film 14 are arranged substantially along the same direction. An end of one carbon nanotube is joined to another end of an adjacent carbon nanotube arranged substantially along the same direction, by van der Waals force, to form a free-standing film. By 'free-standing', it is meant that the carbon nanotube structure does not have to be supported by a substrate and can sustain its own weight when it is hoisted by a portion thereof without tearing. In the carbon nanotube film 14, the adjacent two carbon nanotubes side by side may be in contact with each other or spaced apart from each other. The carbon nanotube film 14 has an extremely large specific surface area and stickiness characteristic.

After the carbon nanotube film 14 is drawn from the carbon nanotube array 12, one end of the carbon nanotube film 14 is adhered on the surface of the flexible substrate 11. The end of the carbon nanotube film 14 can be adhered on the surface of the flexible substrate 11 by an adhesive agent or the stickiness of the carbon nanotube film 14. It should be noted that, an angle $\alpha$ can be formed between the surface of the substrate 13 and the carbon nanotube film 14, when the end of the carbon nanotube film 14 is adhered on the surface of the flexible substrate 11. The angle $\alpha$ can be in a range from about 0 degree to about 30 degrees. For example, an angle between an oriented direction of the plurality of carbon nanotubes in the carbon nanotube array 12 and the carbon nanotube film 14 is in a range from about 60 degrees to about 90 degrees. In some embodiments, the angle $\alpha$ is in a range from about 0 degree to about 5 degrees. In one embodiment, the angle $\alpha$ is equal to about 3 degrees.

In step (S13), the flexible substrate 11 can be rotated with the rotator 20 by the electrical motor under a certain rotating speed, because the flexible substrate 11 is fixed on the surface of the rotator 20. Furthermore, the carbon nanotube film 14 can be drawn from the carbon nanotube array 12 successively and wrapped on the surface of the flexible substrate 11 to form the carbon nanotube layer 15, because the end of the carbon nanotube film 14 is adhered on the surface of the flexible substrate 11. More specifically, during the rotating process, a tension along the surface of the carbon nanotube film 14 can be provided by the flexible substrate 11 to draw the carbon nanotube film 14 from the carbon nanotube array 12 successively.

The rotating speed of the rotator 20 is related to the angle $\alpha$. This is because an amount of the van der Waals force between two adjacent segments of the carbon nanotube film 14 is determined by the angle $\alpha$. For example, when the angle $\alpha$ is in a range from about 0 degree to about 5 degrees, the adjacent segments of the carbon nanotube film 14 can have larger contact area and van der Waals force therebetween. Therefore, a larger rotating speed can be used to draw the carbon nanotube film 14 from the carbon nanotube array 12 without destroying the structure of the carbon nanotube film 14. A linear speed of the rotator 20 can be in a range from about 5 m/s to about 15 m/s. In one embodiment, the linear speed of the rotator 20 is about 10 m/s.

A thickness of the carbon nanotube layer 15 can be controlled by a number of cycles of the carbon nanotube film 14 wrapped on the surface of the flexible substrate 11. In one embodiment, the carbon nanotube layer 15 includes 1000 layers of carbon nanotube film 14 stacked together. Furthermore, because the carbon nanotube film 14 has the stickiness characteristic, adjacent carbon nanotube films 14 in the carbon nanotube layer 15 can be adhere to each other firmly.

A roller 22 can be further provided and can be fixed beside the rotator 20. The roller 22 can have an axis, and the axis of the roller 22 can be parallel to the axis of the rotator 20. A linear contact can be formed between the roller 22 and the rotator 20. The roller 22 can be used to press the carbon nanotube layer 15 and make the carbon nanotube films 14 in the carbon nanotube layer 15 to adhere to each other more firmly during the rotating process. A length of the roller 22 is not limited. A material of the roller 22 can be metal, metal oxide, ceramics, porous material, or rubber. In one embodiment, the material of the roller 22 is rubber.

During the rotating process, an optional step (S131) of treating the roller 22 with an organic solvent can be further provided. The organic solvent can be sprayed on a surface of the roller 22 to reduce a force between the roller 22 and the carbon nanotube layer 15. Therefore, the carbon nanotubes in the carbon nanotube layer 15 will not be adhered on the surface of the roller 22. The organic solvent can be volatile at room temperature and can be ethanol, methanol, acetone, dichloroethane, chloroform, or any combination thereof. In one embodiment, the organic solvent is ethanol.

In step (S14), the flexible substrate 11 and the carbon nanotube layer 15 can be cut along the first direction by mechanical cutting method or laser ablating method to form a layered structure.

In the layered structure, the carbon nanotube layer 15 and the flexible substrate 11 are stacked with each other, and the carbon nanotubes in the carbon nanotube layer 15 are oriented along a preferred orientation and joined end-to-end by van der Waals attractive force therebetween.

The mechanical cutting method includes the steps of: providing a cutter; and cutting the flexible substrate 11 and the carbon nanotube layer 15 along the first direction.

The laser ablating method includes the steps of: providing a laser device; irradiating the flexible substrate 11 and the carbon nanotube layer 15 by the laser device along the first direction to ablate the flexible substrate 11 and the carbon nanotube layer 15. In some embodiments, the first direction is parallel to the axis of rotator 20.

In step (S15), a shape of the plurality of electrodes 16 can be linear. A material of the plurality of electrodes 16 can be metal. The plurality of electrodes 16 can be formed on the surface of the carbon nanotube layer 15 of the layered structure by sputtering, plating, and chemical plating to form the heater 10. A silver glue can also be used to adhere the plurality of electrodes 16 on the surface of the carbon nanotube layer 15 of the layered structure. In one embodiment, two paralleled electrodes are fixed on carbon nanotube layer 15 of the layered structure and spaced with each other. It is to be noted that, an angle β between an oriented direction of the plurality of electrodes 16 and the oriented direction of the carbon nanotubes in the carbon nanotube layer 15 can be in a range from about 0 degrees to about 90 degrees. In one embodiment, the angle β is about 90 degrees.

The step (S15) can be replaced by a step (S15') of: cutting the layered structure into a plurality of sub-layered structures; forming a plurality of electrodes 16 to electrically connect with the carbon nanotube layer 15 in each sub-layered structure, resulting in a plurality of heaters 10 being obtained at one time.

Step (S15) can further include an optional step (S16) of treating the heater 10 with an organic solvent to adhere the carbon nanotube layer 15 with the flexible substrate 11 more tightly. The contact surface between the carbon nanotube layer 15 and the flexible substrate 11 can be increased if the organic solvent treats the heater 10. Thus, the carbon nanotube layer 15 can be adhered to the surface of the flexible substrate 11 more firmly. Furthermore, the carbon nanotube films 14 in the carbon nanotube layer 15 can be adhered to each other more firmly after treating the heater 10 with the organic solvent. The organic solvent can also be ethanol, methanol, acetone, dichloroethane, chloroform, or any combination thereof. The organic solvent should have a desirable wettability to the carbon nanotubes. In this embodiment, step (S16) can include a step of applying the organic solvent on a surface of the heater 10 by dropping the organic solvent from a dropper; or immersing the entire heater 10 into an organic solvent filled in a container.

After the heater 10 is formed, Step (S15) can further include an optional step (S17) of covering another flexible substrate 11 on the surface of the carbon nanotube layer 15 away from the flexible substrate 11. Thus, the carbon nanotube layer 15 can be located between the two flexible substrates 11 to form a layered structure. Thus, the heater 10 can have a stable structure and can be more durable. If the layered structure is obtained, step (S17) can further include an optional step (S171) of treating the layered structure with an organic solvent.

Figure 3:
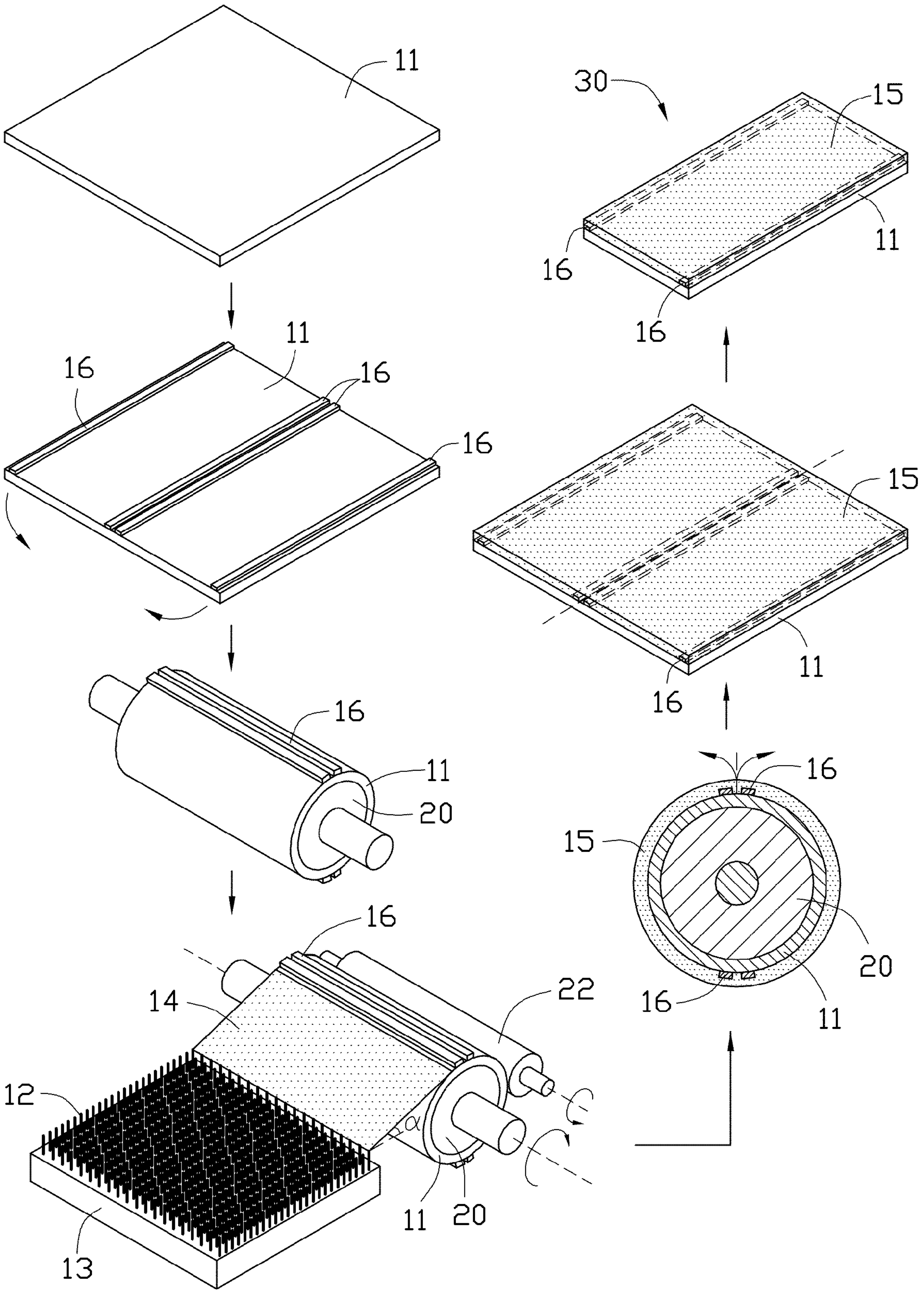
FIG. 3 shows a flow chart of another embodiment of a method to form a plurality of heaters.

Referring to FIG. 3, a method for making a heater 30 of one embodiment can include the following steps:

(S20) providing a rotator 20 having an axis, the rotator 20 can rotate about the axis;

(S21) providing a flexible substrate 11 with a plurality of electrodes 16 located on a surface of the flexible substrate 11 and spaced from each other, and fixing the flexible substrate 11 with the plurality of electrodes 16 on a surface of the rotator 20, wherein the surface of the flexible substrate 11 with the plurality of electrodes 16 thereon is away from the rotator 20;

(S22) drawing a carbon nanotube film 14 from a carbon nanotube array 12 and adhering the carbon nanotube film 14 on the surface of the flexible substrate 11;

(S23) rotating the rotator 20 about the axis and wrapping the carbon nanotube film 14 on the surface of the flexible substrate 11 to form a carbon nanotube layer 15; and (S24) cutting the flexible substrate 11 and the carbon nanotube layer 15 along a first direction.

Steps (S20), (S21) and (S22) are basically the same as steps (S10), (S11) and (S12), except that the plurality of electrodes 16 is fixed on the surface of the flexible substrate 11 before the carbon nanotube film 14 is wrapped on the surface of the flexible substrate 11. The plurality of electrodes 16 fixed on the surface of the flexible substrate 11 can be parallel with each other and spaced with each other.

More specifically, when the flexible substrate 11 is a hollow tub structure, the plurality of electrodes 16 can be fixed on an external surface of the hollow tub structure, and the plurality of electrodes 16 can be spaced with each other and parallel to an axis of the hollow tub structure. When the flexible substrate 11 is a planar structure, the plurality of electrodes 16 can be fixed on a surface of planar structure, and the plurality of electrodes 16 can be spaced with each other and parallel to each other. After the plurality of electrodes 16 is fixed on the surface of planar structure, the planar structure can be curled to form the hollow tub structure by attaching a first end of the planar structure to a second end of the planar structure. The plurality of electrodes 16 can also be on the external surface of the hollow tub structure and parallel to an axis of the hollow tub structure. After the hollow tub structure with the plurality of electrodes 16 is formed, the hollow tub structure with the plurality of electrodes 16 can cover on an outer surface of the rotator 20. In one embodiment, the flexible substrate 11 is a rectangular non-woven cloth with four electrodes fixed on a surface of the rectangular non-woven cloth.

Steps (S23) and (S24) are basically the same as steps S13 and S14, except that the carbon nanotube film 14 is wrapped on surfaces of the plurality of electrodes 16 and the flexible substrate 11. Thus, the plurality of electrodes 16 can be located between the flexible substrate 11 and carbon nanotube layer 15, and electrically connect to the carbon nanotube layer 15. Furthermore, after the flexible substrate 11 and the carbon nanotube layer 15 are cut along the first direction, at least one heaters 30 with at least two electrodes 16 therein can be formed. It is to be noted that, the at least two electrodes 16 can be well connected to the carbon nanotube layer 15, because the at least two electrodes 16 are located between flexible substrate 11 and the carbon nanotube layer 15.

Figure 4:
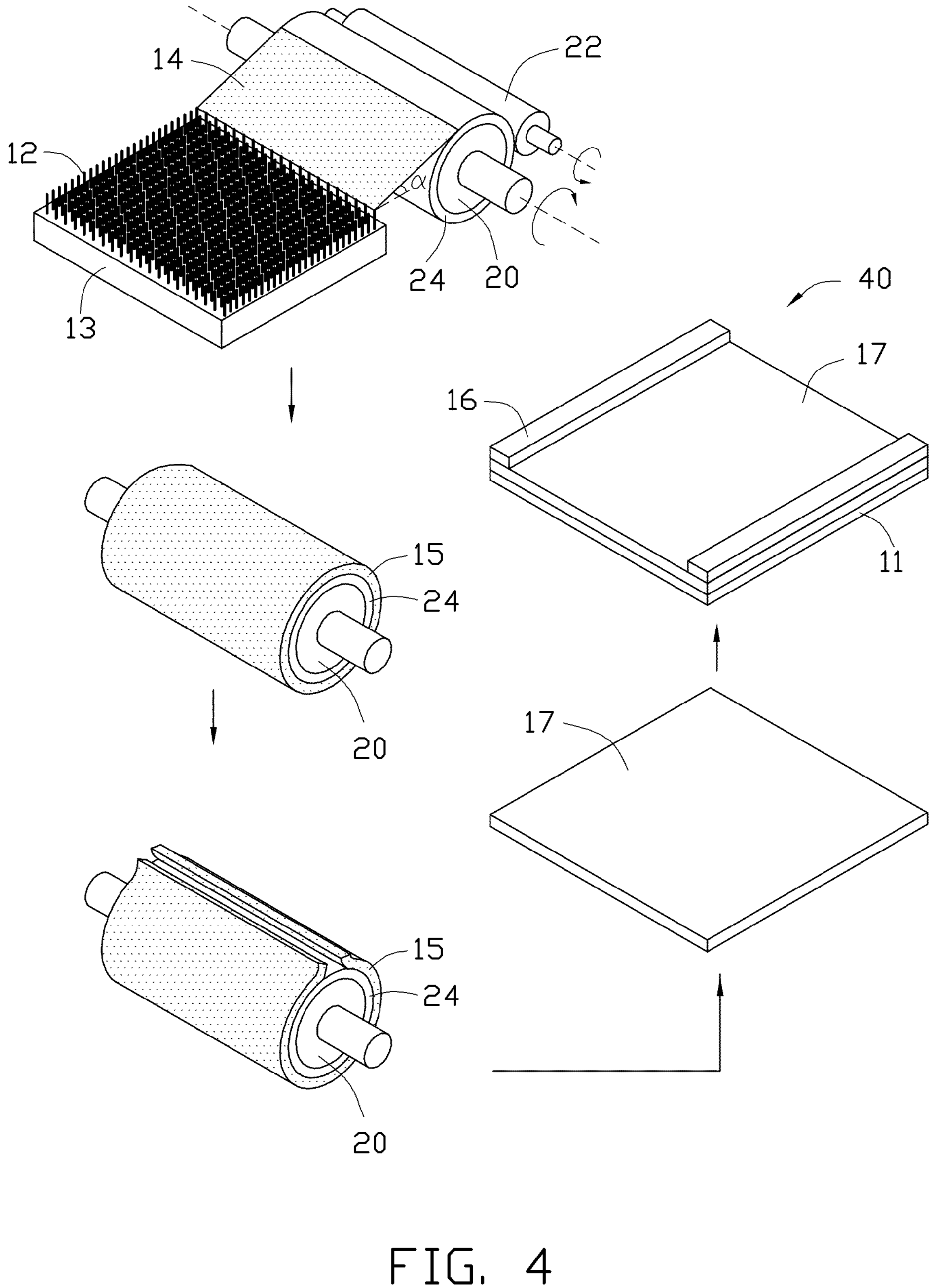
FIG. 4 shows a flow chart of another embodiment of a method to form a heater.

Referring to FIG. 4, a method for making a heater 40 of one embodiment can include the following steps:

(S30) providing a rotator 20 having an axis, the rotator 20 can rotate about the axis;

(S31) drawing a carbon nanotube film 14 from a carbon nanotube array 12 and adhering the carbon nanotube film 14 on a surface of the rotator 20;

(S32) rotating the rotator 20 about the axis and wrapping the carbon nanotube film 14 on the surface of the rotator 20 to form a carbon nanotube layer 15;

(S33) cutting the carbon nanotube layer 15 along a first direction to form a carbon nanotube structure 17;

(S34) providing a flexible substrate 11 and fixing the carbon nanotube structure 17 on a surface of the flexible substrate 11; and (S35) fixing a plurality of electrodes 16 to electrically connect with the carbon nanotube structure 17 on the surface of the flexible substrate 11 to form the heater 40.

The method for making the heater 40 is basically the same as the method for making the heater 10, except that the carbon nanotube film 14 drawn from the carbon nanotube array 12 is directly wrapped on the surface of the rotator 20 to form the carbon nanotube layer 15. Thus, the carbon nanotube structure 17 can be formed by cutting the carbon nanotube layer 15 and the carbon nanotube structure 17 can be further fixed on the surface of the flexible substrate 11 to form the heater 40.

In step (S30), the rotator 20 can further include a coating layer 24 coated on the surface of the rotator 20. The coating layer 24 can include a plurality of micropores distributed uniformly on a surface of the coating layer 24 away from the rotator 20. A diameter of the plurality of micropores can be in a range from about 100 micrometers to about 1000 micrometers. A distance between adjacent micropores can be in a range from about 10 micrometers to about 100 micrometers. A depth of the micropores can be in a range from about 1 micrometer to about 1000 micrometers. In some embodiments, the plurality of micropores is distributed unevenly in the surface of the coating layer 24.

Alternatively, the size and the distribution conditions of the plurality of micropores can be changed according in different embodiments. As long as the ratio of diameter of the plurality of micropores and a distance between adjacent micropores is greater than or equal to 5:1, and the distance between adjacent micropores is less than or equal to about 100 micrometers, so that a void ratio of the surface of the coating layer 24 can be greater than or equal to 80%. A material of the coating layer 24 can be metal, metal oxide, ceramics, or rubber. In one embodiment, the coating layer 24 is an anodic aluminum oxide film. The anodic aluminum oxide film can be made by an anode oxidation method. The anodic aluminum oxide film defines a plurality of the micropores distributed uniformly on the surface. A diameter of the plurality of micropores on the surface of anodic aluminum oxide film is about 500 micrometers. A distance between adjacent micropores is about 50 micrometers.

In step (S31), one end of the carbon nanotube film 14 drawn from the carbon nanotube array 12 can be directly adhered on the surface of the rotator 20 by an adhesive agent or the stickiness of the carbon nanotube film 14. An angle α can also be formed between the surface of the substrate 13 and the carbon nanotube film 14, when one end of the carbon nanotube film 14 is adhered on the surface of the rotator 20. The angle α can be in a range from about 0 degree to about 30 degrees. In some embodiments, the angle α is in a range from about 0 degree to about 5 degrees. In one embodiment, the angle α is equal to about 3 degrees.

Step (S31) can further include an optional step (S311) of treating the surface of the rotator 20 with an organic solvent to reduce a force between the carbon nanotube film 14 and the rotator 20. The organic solvent can also be ethanol, methanol, acetone, dichloroethane, chloroform, or any combination thereof. In one embodiment, step (S311) can include a step of spraying the organic solvent on the surface of the rotator 20.

In step (S32), the carbon nanotube film 14 can be drawing from the carbon nanotube array 12 successively and wrapped on the surface of the rotator 20 to form the carbon nanotube layer 15, because the end of the carbon nanotube film 14 is adhered on the surface of the rotator 20. More specifically, during the rotating process, the rotator 20 provides a tension along the surface of the carbon nanotube film 14 by drawing the carbon nanotube film 14 from the carbon nanotube array 12 successively.

In steps (S33), (S34), and (S35), after the carbon nanotube layer 15 is cut along the first direction, the carbon nanotube layer 15 can be peeled off from the surface of the rotator 20 to form the carbon nanotube structure 17. It is to be noted that, because the coating layer 24 having a plurality of micropores is fixed between the carbon nanotube layer 15 and the rotator 20, an effective contact area between carbon nanotube layer 15 and the coating layer 24 can be reduced. Thus the carbon nanotube layer 15 can be peeled off from the surface of the rotator 20 easily without damage.

Furthermore, after a first given time for wrapping the carbon nanotube film 14 on the surface of the rotator 20, a plurality of electrodes 16 can be fixed on a surface of the carbon nanotube layer 15. The plurality of electrodes 16 can be parallel to the axis of the rotator 20 and spaced apart from each other. After the plurality of electrodes 16 is fixed on the surface of the carbon nanotube layer 15, a second given time for continue wrapping the carbon nanotube film 14 on the surface of the rotator 20 and the plurality of electrodes 16 can be further provided. Thus, the plurality of electrodes 16 can be embedded in the carbon nanotube layer 15 to lower a contact resistance between the plurality of electrodes 16 and the carbon nanotube layer 15.

The heater has at least the following advantages. First, the heater has high strengthen and high durability characteristics, because the carbon nanotube layer in heater has a plurality of carbon nanotube film stacked together. Second, the plurality of carbon nanotubes in the heater oriented along a preferred orientation, so that the heater can have high heating efficiency.

The method for making the heater has at least the following advantages. First, it is convenient to make a heater by drawing a carbon nanotube film from a carbon nanotube array and wrapping the carbon nanotube film on the rotator or the flexible substrate. Second, if the carbon nanotube structure is secured by the two flexible substrates, the carbon nanotube structure can be firmly fixed. Furthermore, the layered structure can protect the carbon nanotube structure from the external forces and dust. Third, it is also convenient to make a plurality of the heaters at one time.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a heater, the method comprising:

(a) providing a rotator having a first axis and a rotating surface, and the rotating surface capable of rotating about the first axis;

(b) providing a flexible substrate with a plurality of electrodes located on a first surface of the flexible substrate and fixing the flexible substrate on the rotating surface of the rotator, wherein the first surface of the flexible substrate with the plurality of electrodes thereon is away from the rotator;

(c) drawing a carbon nanotube film from a carbon nanotube array and adhering the carbon nanotube film on the first surface of the flexible substrate;

(d) wrapping the carbon nanotube film on the first surface of the flexible substrate to form a carbon nanotube layer by rotating the rotator about the first axis; and (e) cutting the flexible substrate and the carbon nanotube layer along a first direction.

2. The method of claim 1, wherein the carbon nanotube array comprises a plurality of carbon nanotubes oriented along a same direction, and an angle between the oriented direction of the plurality of carbon nanotubes and the carbon nanotube film is in a range from about 60 degrees to about 90 degrees.

3. The method of claim 2, wherein the angle between the oriented direction of the plurality of carbon nanotubes and the carbon nanotube film is in a range from about 85 degrees to about 90 degrees.

4. The method of claim 3, wherein a linear speed of the rotating surface of the rotator rotating about the first axis is in a range from about 5 m/s to about 15 m/s.

5. The method of claim 1, wherein after the flexible substrate is fixed on the rotating surface of the rotator, and the plurality of electrodes is parallel to the first axis of the rotator.

6. The method of claim 1, wherein the flexible substrate and the carbon nanotube layer is cut along the first direction by a mechanical cutting method or a laser ablating method, and the first direction is parallel to the first axis of the rotator.

7. The method of claim 1, wherein a roller is further provided and fixed beside the rotator, the roller has a second axis and the second axis is parallel to the first axis, and a linear contact is formed between the roller and the rotator.

8. The method of claim 1, wherein the flexible substrate comprises a material that is selected from the group consisting of silicone rubber, PVC, PTFE, and non-woven cloth.

9. The method of claim 1, wherein the step of cutting the flexible substrate and the carbon nanotube layer along a first direction further comprises applying a second flexible substrate on the carbon nanotube layer to make the carbon nanotube layer located between two flexible substrates.

10. The method of claim 1, wherein the step of cutting the flexible substrate and the carbon nanotube layer along a first direction further comprises treating the flexible substrate and the carbon nanotube layer with an organic solvent to adhere the carbon nanotube layer with the flexible substrate more tightly.

* * * * *